R. D. ROTH.
MILKING MACHINE.
APPLICATION FILED NOV. 21, 1911.
1,063,737.
Patented June 3, 1913.
2 SHEETS—SHEET 1.
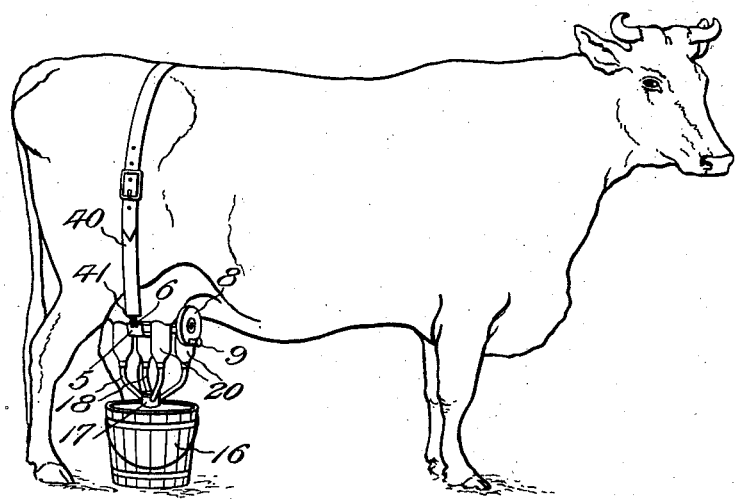
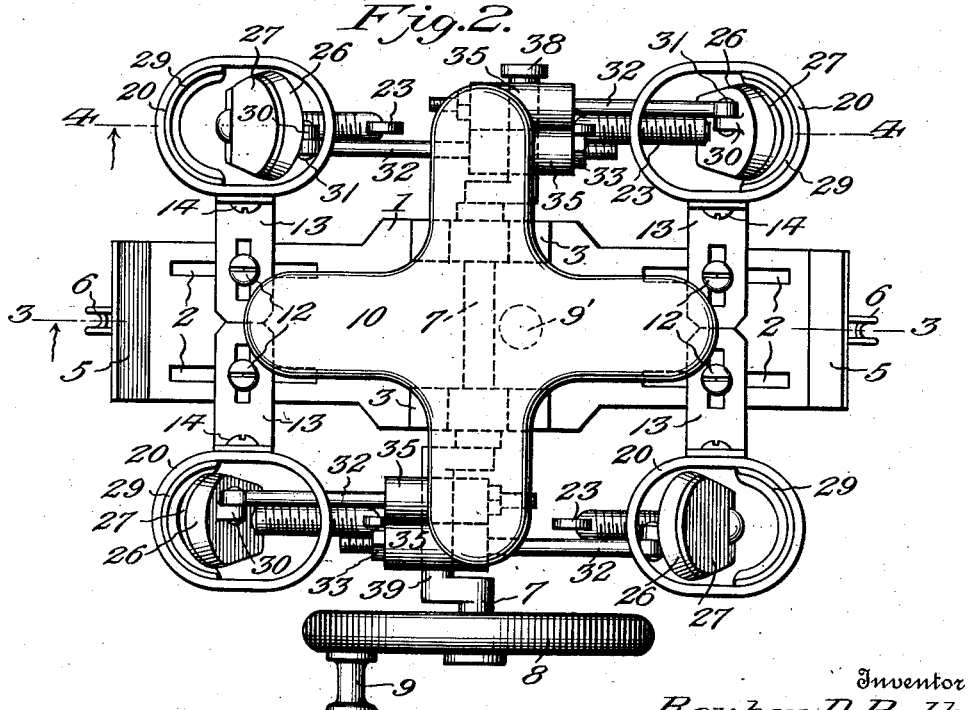
Witnesses
Edwin G. McKee
Mary C. Sheridan
Inventor
Reuben D. Roth
By Geo. W. Sues
Attorney

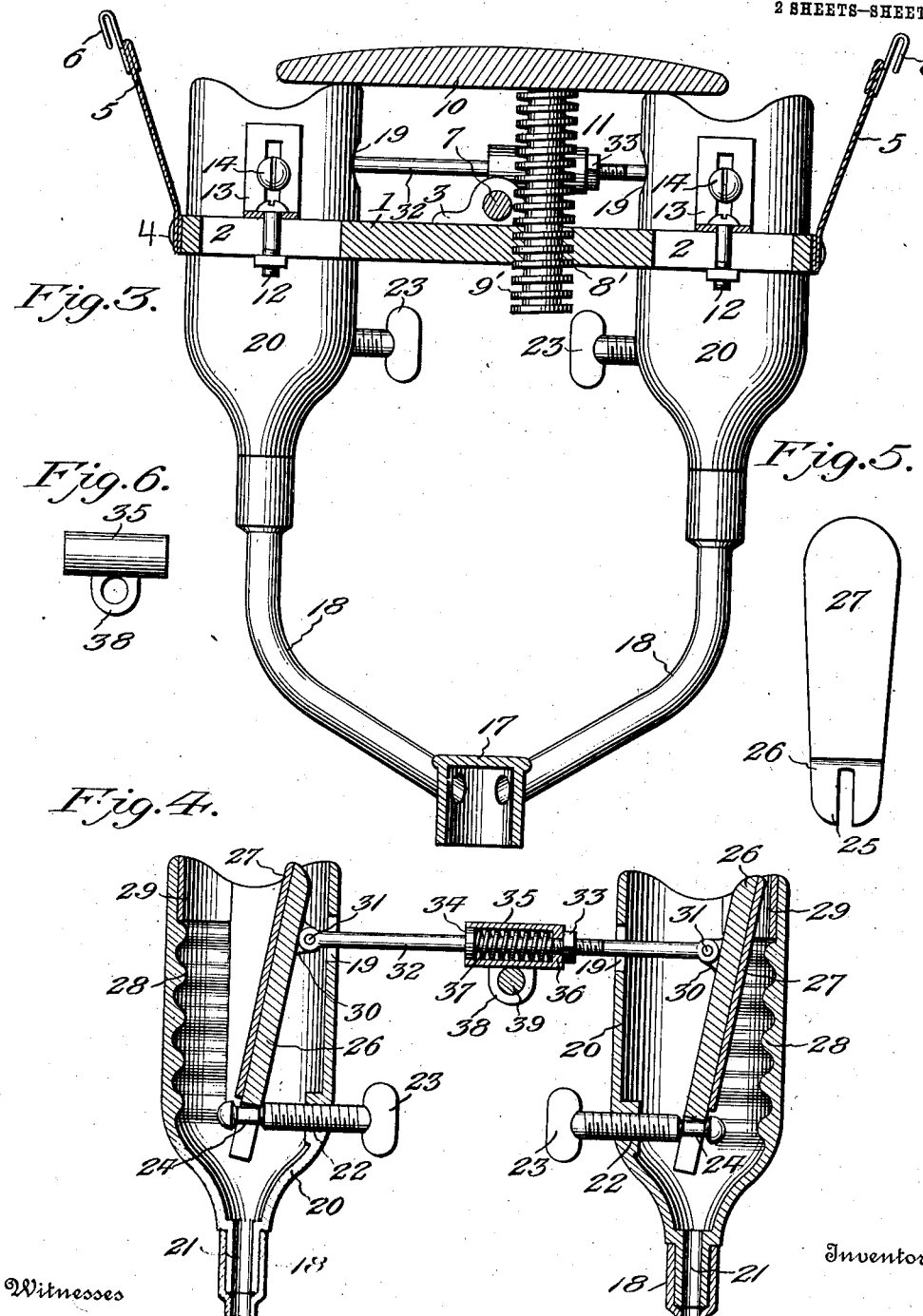

UNITED STATES PATENT OFFICE.

REUBEN D. ROTH, OF GETTYSBURG, PENNSYLVANIA.

MILKING-MACHINE.

1,063,737.     Specification of Letters Patent.     Patented June 3, 1913.

Application filed November 21, 1911. Serial No. 661,594.

*To all whom it may concern:*

Be it known that I, REUBEN D. ROTH, a citizen of the United States, and a resident of Gettysburg, in the county of Adams and State of Pennsylvania, have invented certain new and useful Improvements in Milking-Machines, of which the following is a specification, reference being had to the accompanying drawings.

This invention has relation to certain new and useful improvements in manually operated milking machines arranged to be strapped to a cow; and the primary object of my invention is to provide a readily operated device of this general character, of a simple and inexpensive nature and of a compact and durable construction, which shall be capable of accurate and convenient adjustment in position to receive the teats of a cow in a manner permitting the cow being readily, speedily and effectively milked.

Another object is to provide a milking machine with universally adjusted milking cups.

A further object is to provide a milking machine with an adjustably held cruciform follow plate, arranged to press against the udder of the cow during the milking operation, to prevent the animal from with-holding her milk. And finally, I aim to provide a milking machine in which the operation of the mechanical instrumentalities simulates the action of a human hand during the act of milking.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views, Figure 1, shows a milking machine constructed according to my invention secured to a cow. Fig. 2, is a top view of the milking machine. Fig. 3, is a section on line 3, 3, of Fig. 2. Fig. 4, is a section on line 4, 4, of Fig. 2. Fig. 5, shows a detached detail of one of the rocking blades. Fig. 6, shows a detached detail of one of the crank boxings.

People do not milk cows from choice. Manually milking a cow is a time-consuming and laborious task and in my present invention I provide a mechanical milker, which while speedy in action, is so simple and can be so easily operated that even children can use the same as effective as adults.

In carrying out the object of my invention, I employ an oblong carrying plate 1, which near each end are the parallel running slots 2, 2, shown in Fig. 2, and intermediate of its ends this plate gives support to the bearings 3, 3. Secured to each end of the plate by means of the screws 4, shown in Fig. 3, are the straps 5, each carrying a hook 6. Revolubly held within the bearings 3 is the crank shaft 7, which at one end has the crank 38, and at the opposite end the crank 39, a stub shaft section extending from the crank 39, as shown in Fig. 2, to which is secured the operating wheel 8, having a handle 9. Adjustably held within the opening 8' in the carrying plate 1, shown in Fig. 3, is the threaded stem 9', which at its upper end carries the cruciform follow plate 10. This follow plate 10 is arranged to hold the udder of the cow in adjustable relation to the teat cups and performs a very important function, in that it is found that in the use of this cruciform follow plate the cow is prevented from with-holding her milk. Slidably held within the four slots 2, are the set screws 12, clearly shown in Fig. 2, and these set screws adjustably hold the slotted ears 13. As shown, the ears may be readily adjusted lengthwise or laterally of the plate while being pivotally held upon the screws.

As disclosed in Fig. 2, each slotted ear 13 carries a teat cup, these cups being slightly oval in cross-section, the cups being secured by means of the set screws 14, so that the cups may be raised and lowered relative to the carrying plate 1. A practically universal adjustment in a plane co-incident with that of the carrying blade 1, is permitted by means of the screws 12 working within the slots 2 and the slots of the ears, as shown in Fig. 2. Each teat cup 20 includes a tubular member open at one end, as shown in Fig. 4, while the opposite or lower end is contracted and ends in a nipple 21. Near the lower end at one point each cup has a threaded boss 22, through which a swivel screw 23 passes to the swivel end 24 of which is movably secured the lower slotted end 25 of an oblong milking blade 26, which has its active face covered with a soft sheet 27 forming a pad, made of felt, rubber or other suitable material. About half of the interior surface of each cup 20, as shown at 28 in Fig. 4, at a point opposite the threaded boss 22, is transversely corrugated. These corrugations serve in holding the teats within the cups. The upper end of each cup is scalloped to conveniently receive the base of the teat, while above the corrugations are positioned the pads 29. Each blade 26 upon its rear face has an ear 30 carrying a pin 31, and each pin gives pivotal support to a pitman 32 threaded at its end and carrying a set nut 33, clearly shown in Fig. 4. Intermediate of its ends each pitman has a piston 34. Each piston works within a tubular crank boxing 35 having an apertured end 36 through which a crank stem passes, and held between each boxing end 36 and piston 34 is a coil spring 37, so that each piston is yieldingly, resiliently and adjustably connected to its crank boxing. Each crank boxing 35 has a bearing eye 38, shown in detail in Fig. 6, arranged to receive a crank section. The pitman 32 passes through suitable slots 19 within the cups, as disclosed in Fig. 4. Secured to the lower end of each cup 20 is a tube 18, the four tubes being secured to a union 17, as shown in Fig. 3.

The machine is held in operative position by means of a belt 40 having the terminal loops 41, arranged to engage the hooks 6, in the manner shown in Fig. 1. The cups are adjusted to meet the physical peculiarities of the cow and are set by means of the screws 12 and 14. The rocking blades 26 are adjusted by means of the nuts 33 and the swivel screws 23.

In securing the machine to the cow, the belt 40 is placed on the back of the animal and secured to the hooks 6. A suitable receptacle 16, as shown in Fig. 1, is then placed below the union 17 which forms the nozzle to receive the milk. The follower 10 is then given the necessary adjustment so that the same will press against the udder between the teats. The crank shaft 7 is then slowly rotated enabling the teats to find proper adjustment within the cups. When it is certain that the teats are all in proper position, the speed of the shaft 7 is slowly increased. In the operation of the machine all four teats are simultaneously milked.

A milking machine constructed according to my invention is inexpensive and simple in its operation and does not clog the teats in the cup. The operation of the blades further simulates the action of a human hand in the act of milking a cow. The action and pressure of the rocking blades further can be accurately and conveniently regulated to meet the individual requirements of each animal.

In providing the cruciform follow plate, the cow is prevented from with-holding her milk, which is very important as with mechanical milking machines as ordinarily constructed, it is found that many cows are able to with-hold their milk.

The entire machine being made of metal can be easily sterilized and so conform to the requirements of sanitation. The machines are preferably built in several sizes, and finally, after the machine has been adjusted the cow can be milked with ease, accuracy and despatch.

Having thus described my said invention, what I claim as new and desire to secure by United States Letters Patent is:—

1. A milking machine comprising a plate, cups mounted thereon, movable blades located in the cups, means for operating the blades, and a cruciform plate supported from the first mentioned plate and having its branches disposed above and between the cups.

2. A milking machine comprising a plate, cups mounted thereon, movable blades located in the cups, means for operating the blades, a cruciform plate supported from the first mentioned plate and having its branches disposed above and between the cups and means for moving said plates with relation to each other.

3. A milking machine comprising a plate, cups mounted thereon, movable blades located in the cups, a shaft journaled upon the plate, and resilient means operatively connecting the cups with the shaft.

In testimony whereof I affix my signature, in presence of two witnesses.

REUBEN D. ROTH.

Witnesses:
J. C. MACKLEY,
C. C. DEARDORFF.